(12) United States Patent
Ott

(10) Patent No.: US 7,247,814 B2
(45) Date of Patent: Jul. 24, 2007

(54) SYSTEM AND METHOD FOR DATA COMMUNICATIONS OVER A GAS HOSE IN A WELDING-TYPE APPLICATION

(75) Inventor: Brian L. Ott, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 107 days.

(21) Appl. No.: 10/907,179

(22) Filed: Mar. 23, 2005

(65) Prior Publication Data

US 2006/0213892 A1    Sep. 28, 2006

(51) Int. Cl.
B23K 9/10    (2006.01)
(52) U.S. Cl. ...................................... 219/132
(58) Field of Classification Search ............... 219/132, 219/74, 75
See application file for complete search history.

(56) References Cited

U.S. PATENT DOCUMENTS 2,384,618 A *  9/1945  Hebeler ....................... 338/39
4,266,114 A    5/1981  Hansen
5,039,835 A    8/1991  Schwiete
5,276,305 A    1/1994  Hsien
6,040,555 A    3/2000  Tiller et al.
6,423,936 B1   7/2002  Reed
6,570,132 B1   5/2003  Brunner et al.

FOREIGN PATENT DOCUMENTS

JP           60-206569 A  *  10/1985

OTHER PUBLICATIONS

English Translation of JP60-206569A.*

* cited by examiner

Primary Examiner—Clifford C. Shaw
(74) Attorney, Agent, or Firm—Ziolkowski Patent Solutions Group, SC

(57) ABSTRACT

The present invention includes a system and method of controlling a remotely located welding-type power source. A communications system includes a user interface to accept a user input at a portable location and a gas purging device to systematically purge pressurized gas from a gas line connecting the portable location to a remote location based on the user input. The communications system also includes a sensor to sense pressure changes in the gas line at the remote location and a processor configured to convert the sensed pressure changes to a representation of the user input.

37 Claims, 5 Drawing Sheets

SYSTEM AND METHOD FOR DATA COMMUNICATIONS OVER A GAS HOSE IN A WELDING-TYPE APPLICATION

BACKGROUND OF THE INVENTION

The present invention relates generally to communications systems and, more particularly, to a method and apparatus for data communications over pressurized gas. Specifically, the invention relates to a transceiver or transmitter and receiver configured to communicate data over a gas supply line to control a remote device.

There are a variety of welding-type processes that require both power cables and gas lines. An example of where such a system would be particularly useful is in welding systems where power and gas supplies are remote from the welding location. Specifically, Tungsten Inert Gas (TIG) welding systems include a tungsten electrode to generate a welding arc and an inert shielding gas to protect and improve the weld. Additionally, Metal Inert Gas (MIG) welding, formerly known as Gas Metal Arc Welding (GMAW), combines the inert shielding gas of TIG welding processes with a continuous, consumable wire electrode.

These welding systems are useful in welding a variety of metals and alloys, for example, steel, aluminum, and stainless steel. Therefore, welding systems have been utilized in a wide variety of applications from remote field pipe line construction and repair projects to industrial shipbuilding applications. In many of these applications, the welding location is often well removed from the stationary position of both the shielding gas supply and the power source. Accordingly, welding systems have been developed that include a portable welding torch and/or a portable wire feeder system that is transportable to a welding location. These portable torches and wire feeders can be moved to a location desirable for performing the welding process while the large, bulky, and heavy power source and shielding gas supply remain fixed at a remote location. Accordingly, shielding gas and power must be delivered from the remote power source and shielding gas supply to the portable wire feeder and welding torch.

While these welding systems allow improved mobility so that an operator can move about more freely, these systems typically do not allow the operator to manipulate the operational parameters of the welding system from the welding location without the addition of a control cable specifically dedicated to such a purpose. Therefore, before traveling to the welding location, an operator inputs an initial set of operational parameters to the power source through a user interface located on the power source. However, once the operator has reached the remote welding location, the operator may need to augment the operational parameters. In this case, the operator must either return to the power source to make the necessary adjustments or communicate the requested modifications to an assistant. If the operator is working alone, the operator must travel from the welding location back to the remote power source, input the augmented operational parameters into the power source, and then travel back to the welding location. On the other hand, should the operator have an assistant, operator travel to and from the power source may be alleviated but include the added cost of additional personnel and the consumption of additional man hours. As such, assistants are not typically utilized and instead of traveling to and from the power source, in practice, the adjustment is often not made. Instead, the operator elects to force the welding process to conform to the present parameters rather than the desired parameters. This can result in less than optimal weld quality.

To alleviate the need to repeatedly travel to and from the welding location and power source or communicate to an assistant, some welding systems have included a remote control to communicate over a cable running between the remote control and the power source. In this case, augmented operational parameters may be input into the remote control and then communicated across a communications link back to the remote power source. Such a link would preferably be incorporated into the cables carrying welding power so that the operator need only pull one cable and a gas supply line to the remote location. While these remote control systems allow the operator to communicate changes in operational parameters remotely, a significant drawback to these cable-based remote controls is that the control cable is relatively fragile. As such, since welding machines are commonly used at construction sites, such as shipyards, where it is not uncommon for the cables and lines to be periodically relocated or surrounded by heavy equipment operating in the same area, such communications cables are readily prone to damage. These remote control communications cables can become damaged by being crushed or snagged by surrounding machines and/or traffic. Furthermore, should the communications cable become damaged, this may, in turn, cause damage to the wire feeder and/or the welding power source if internal power conductors come in contact with sensitive circuitry via a short to the internal communication cables.

As such, many welding systems have been developed to allow remote communication of changes to the operational parameters without introducing an additional communications link between the remote control and the power source. For example, some remote controlled systems include a radio-frequency (RF) transmitter remote control. This approach has several disadvantages. First, electric arc welding may create RF interference that negatively affects the communication between the remote transmitter and the receiver at the power source. Second, if the system is used inside metal structures such as tanks, ships, or large aircraft, the radio link can be lost due to the shielding effect of the metallic surroundings. Third, if multiple welding stations use a radio link for remote control, each remote control system, both transmitting and receiving ends, typically requires a unique identifier to prevent cross-talk or mistransmission of control signals between the welding machines. That is, since the transmitter and receiver nodes are not connected by a wire, the possibility exists that a transmitter and receiver from two different machines may inadvertently communicate. In this case, the welding systems may operate incorrectly due to this cross-talk or miss-transmission of control signals.

Alternatively, some remote control systems have been integrated with wire feeders such that the remote control can communicate with the power source via the positive and negative electrode of the welding power cable. In this case, the welding power cable serves the dual purpose of supplying welding power to effectuate the desired welding process as well as functioning as the communications link to allow the integrated remote control of the wire feeder to communicate with the remote power source. Additionally, systems that employ high-frequency (HF) starting may induce noise within the welding power cable that can interfere with any communications traveling along the welding power cable.

Therefore, it would be desirable to design a communications system that is capable of accurately controlling a remotely located welding power source without introducing additional communications conduits or components that significantly affect the portability of the wirefeeder or welding torch of the welding system. Additionally, it would be desirable to design a welding system that is virtually impervious to RF or other electrical interference.

BRIEF DESCRIPTION OF THE INVENTION

The present invention is directed to a communications system to control a remote device that overcomes the aforementioned drawbacks. Specifically, the communications system uses shielding gas to a welding torch as a means to communicate operational parameters to a welding power source. The operational parameters communicated to the power source may include, but are not limited to welding power source output commands, welding circuit on/off commands, power source mode control commands, or any other useful data. A transmitter transmits the desired operational parameters to a receiver disposed in or near the power source. The transmitter is configured to control gas flow to communicate a bit stream that represents the desired operational parameters to the receiver.

Therefore, in accordance with one aspect of the present invention, a communications system is disclosed that includes a user interface to accept a user input at a portable location and a gas state modifier to systematically alter a state of pressurized gas in a gas line connecting the portable location to a remote location based on the user input. The communications system also includes a sensor to sense state changes in the gas line at the remote location and a processor configured to convert the sensed state changes to a representation of the user input.

In accordance with another aspect of the present invention, a wire feeder is disclosed that includes a gas flow controller configured to control gas flow from a gas supply line connected to a gas source and at least one user interface configured to accept at least one desired operational parameter of a desired welding process. The wire feeder also includes a transmission controller configured to accept the at least one operational parameter and control the gas flow controller to communicate the at least one operational parameter across the gas supply line.

According to another aspect of the present invention, a welding power source control module is disclosed that includes an inlet configured to receive welding gas from a gas source, an outlet configured to allow the welding gas to pass from the control module, and a passage connecting the inlet and the outlet. The welding power source control module also includes a controller configured to monitor the passage to determine variations in a flow rate of the welding gas indicative of a communications bit stream and read the communications bit stream. The controller is also configured to determine a user-selected operational parameter from the communications bit stream and communicate the user-selected operational parameter to a welding power source.

In accordance with yet a further aspect of the present invention, a communications kit configured to retrofit a welding-type system is disclosed that includes a transmission module configured to accept a user-selected welding parameter and control a flow of welding gas to communicate the user-selected welding parameter. The communications kit also includes a receiver module configured to monitor the flow of welding gas to receive and interpret the user-selected welding parameter and communicate the user-selected welding parameter to a welding power source.

According to another aspect of the present invention, a method of communicating data is disclosed that includes receiving a user input at a portable location and systematically purging pressurized gas from a gas line connecting the portable location to a remote location based on the user input. The method also includes sensing pressure changes in the gas line at the remote location and interpreting the sensed pressure changes to form a representation of the user input.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to remotely controlling a power source based on commands communicated over a pressurized shielding gas line. While the welding system is described as a MIG welding system, the present invention is equivalently applicable with TIG welding systems or any other welding-type system that utilizes pressurized gas for welding-type process, such as Metallic Active Gas (MAG) welding process. Additionally, it is contemplated that reference to welding gas or shielding gas may equivalently include any gas subject to state changes, such as pressure or flow changes. Therefore, the use of an inert welding gas supplied to a workpiece by a welding torch to create an inert atmosphere thereabout is but one type of system that may incorporate the present invention. That is, it is also contemplated that the present invention may be utilized with welding-type systems, such as plasma cutting systems that utilize a cutting gas flow of air to effectuate a plasma cutting process. Therefore, reference to welding systems includes any system that employs gas supplies for a variety of purposes such as shielding gas, purging gas, or cutting gas. The present invention may be useful in any system that would benefit from communicating through controlling gas state changes.

Figure 1:
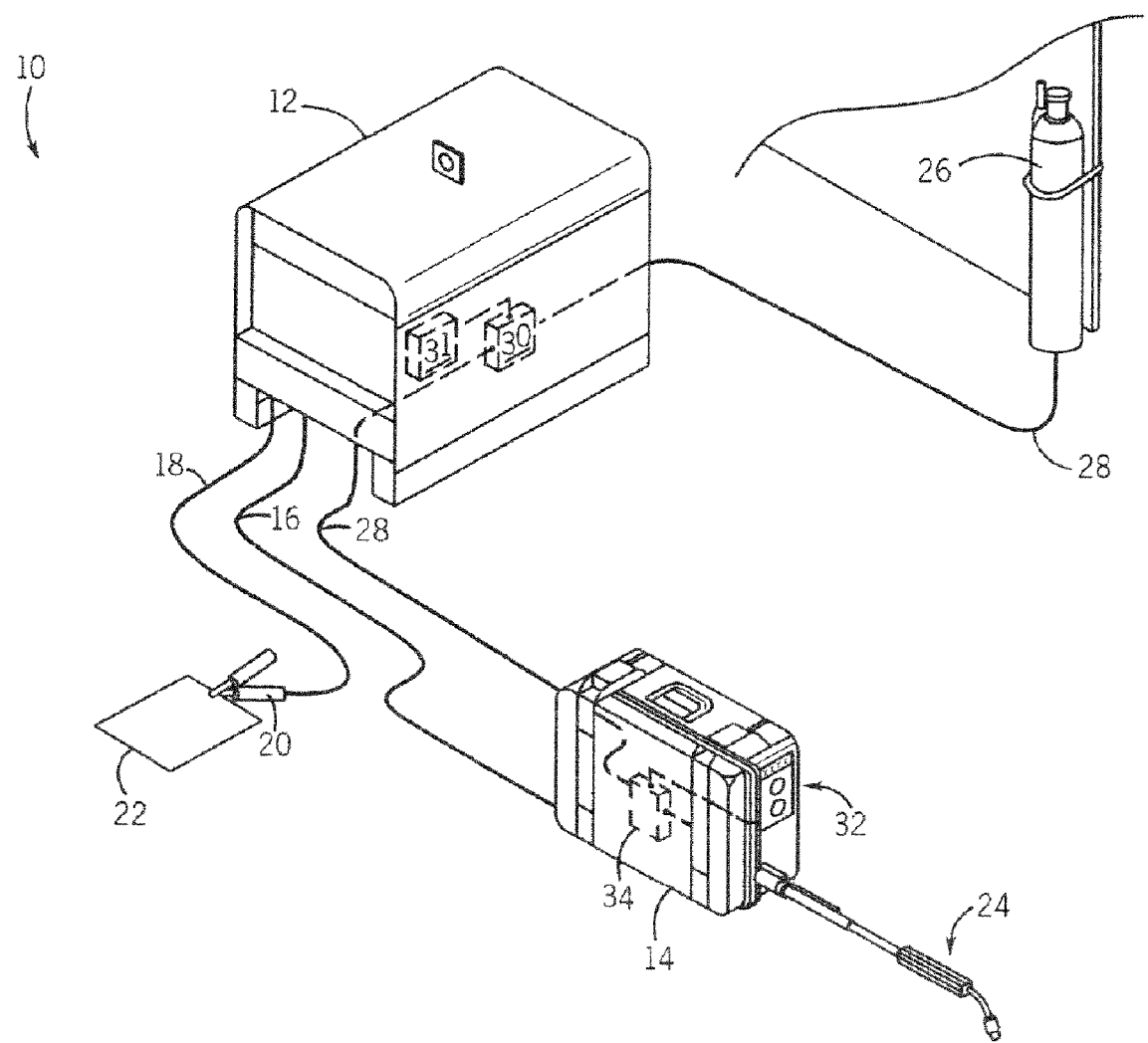
FIG. 1 is a perspective view of a welding system in accordance with one aspect of the present invention.

Referring to FIG. 1, a MIG welding system 10 is shown that includes a welding power source 12 designed to supply power to a wire feeder 14 through a welding power cable 16. Also connected to the power source is a grounding cable 18 that connects the power source 12 to a clamp 20 designed to engage a workpiece 22 to complete a welding circuit. Connected to the wire feeder 14 is a welding gun or torch 24 configured to supply consumable welding wire to a weld to effectuate the desired welding process. The welding system 10 further includes a gas cylinder 26 that may be routed through or near the power source 12 via gas supply lines 28. As will be described, the gas supply line 28 includes a receiver module 30 connected to a control module 31 of the power source 12. The control module 31 controls power output, function, and various other parameters of the power source 12.

The wire feeder 14 includes a user input 32 configured to accept user-selected operational parameters for the desired welding process. As will be described with respect to FIGS. 1–4, the user-selected operational parameters are communicated to a transmitter module 34 that, in turn, communicates the operational parameters over the gas supply line 28 to the receive module 30. Specifically, the transmitter module 34 is configured to operate as a state modifier to modify a state of the gas within the gas supply line 28. The receiver module 30 is configured to sense state changes in the gas and interpret the state changes to receive the operational parameters.

According to one embodiment, the transmitter module 34 is configured to control a state of the gas in the gas supply line 28 by controlling gas flow through the gas supply line 28 to communicate a bit stream indicating the user-selected operational parameters to the receive module 30. That is, the transmission module 34 alters a state of the gas in line 28 and the receiver module 30 monitors the gas line 28 to detect the altered state. Specifically, the module transmission 34 systematically purges gas from gas line 28 according to a communications scheme to alter the state of the gas and the receiver module 30 monitors variations in gas flow to receive and interpret a bit stream. The receiver module 30 then commands the control module 31 or the power source 12 to operate according to the user-selected operational parameters input through the user interface 32 of the wire feeder 14.

Additionally or alternatively, it is contemplated that the transmitter module 34 may utilize sound waves to control the state of the gas in the gas supply line 28 to communicate the operational parameters to the receive module 30. That is, the transmitter module 34 may be configured to inject sound waves to propagate over the gas in the gas supply line 28. The receiver module 30 is configured to monitor the gas in the gas supply line 28 to receive and interpret the sound waves to receive the operational parameters.

Figure 2:
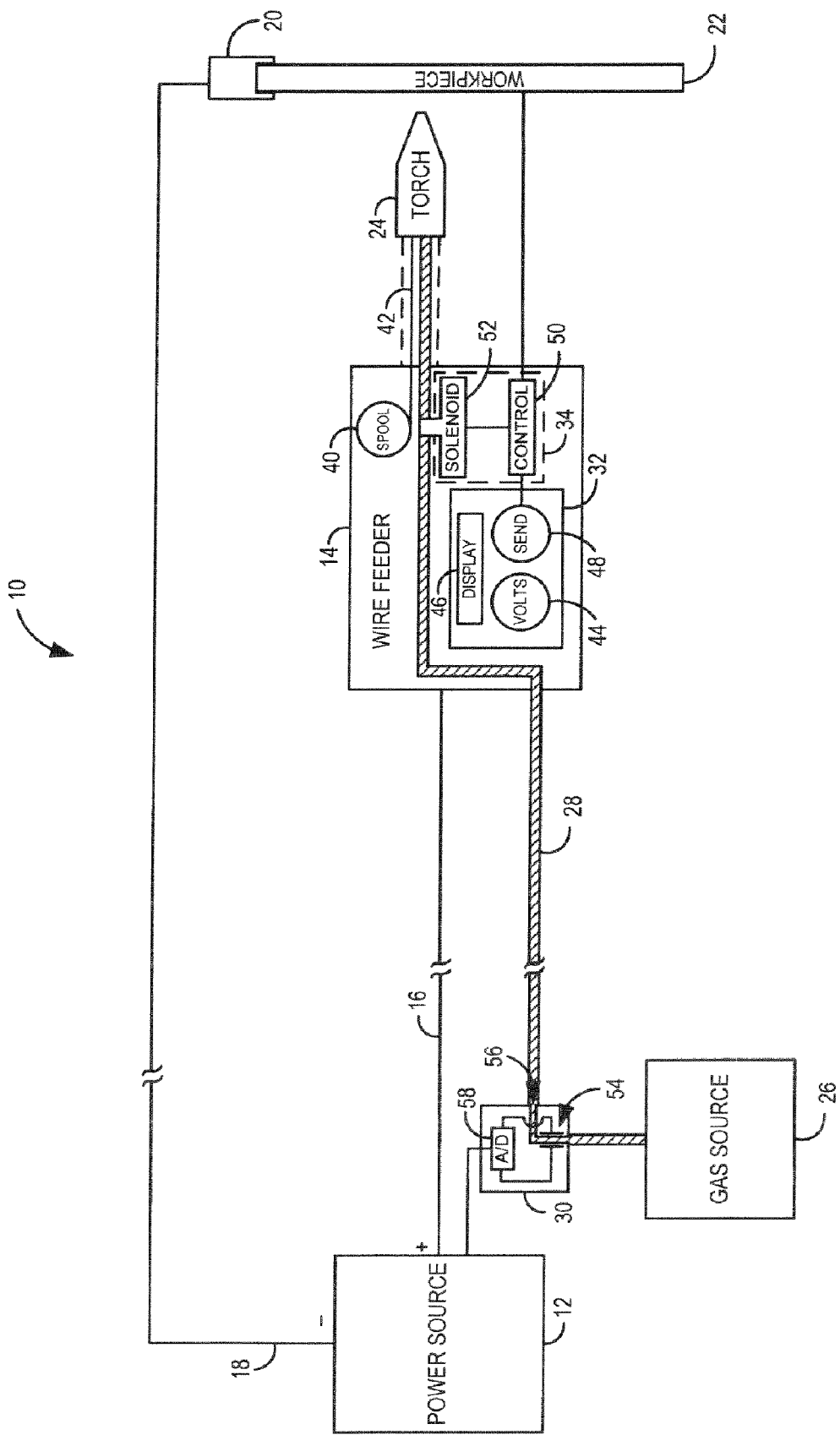
FIG. 2 is a schematic block diagram of the welding system illustrated in FIG. 1 in accordance with one aspect of the present invention.

Referring to FIG. 2, a schematic diagram of the welding system 10 is shown. As illustrated, the receiver module 30 is an autonomous module. That is, unlike the embodiment shown in FIG. 1 where the receiver module 30 is integrated with the power source 12, FIG. 2 shows that the receiver module 30 may be configured to be an autonomous unit so as to facilitate retrofitting traditional power sources. It is also contemplated that the wire feeders may equivalently be retrofitted with an autonomous transmission module 34. Similarly, it is contemplated that the transmission module 34 may be an autonomous unit to facilitate retrofitting systems, such as TIG welders or plasma cutters that do not employ a wire feeder. Furthermore, it is contemplated that the transmission module may be incorporated or integrated with a welding or plasma cutting torch.

As shown, the wire feeder 14 includes a spool 40 configured to supply consumable weld wire 42 to the torch 24 during the welding process. Additionally, the user interface 32 of the wire feeder 14 includes a plurality of inputs. As shown, it is contemplated that the user interface 32 may include a voltage input 44 to facilitate user selection of a desired output or welding voltage. While only a voltage input 44 is shown, it is also contemplated that the user interface 32 may include other inputs configured to accept a variety of operational parameters such as desired output current, desired operational mode (i.e. constant current or constant voltage), power ON/OFF selection, and other data communications. A display 46 is also preferably included to indicate the operational parameter and corresponding value that the operator has most recently augmented. Additionally, a send control 48 may be utilized for certain applications to finalize input of the desired operational parameters and commence transmission of the operational parameters to the receiver module 30.

In particular, an operator enters the desired operational parameters using the user input/voltage selector 44. The desired operational parameters are communicated to display 46 to display the user-selected operational parameters for operator review. It is contemplated that the input/voltage selector 44 may be an analog input or digital input. In either case, a converter (not shown), such as an analog-to-digital converter or digital-to-digital converter may be included to communicate the user-selected operational parameters to the display 46. Once the operational parameters displayed on the display 46 are deemed satisfactory by the operator, the operator engages the send control 48. Accordingly, the user-selected operational parameters are transmitted from the user interface 32 to the transmission module 34.

The transmission module 34 includes a control 50 and a solenoid valve control 52. While the control 50 is illustrated as contained within the transmission module 34, it is contemplated that the functions of the transmission module 34 may equivalently be performed by an integrated processing unit, such as those commonly included in many remote wire feeders. Once the user-selected operational parameters are sent to the transmission module 34, the control 50 confirms the user-selected operational parameters and prepares the information for transmission to the receiver module 30. According to one embodiment, the data forming the user-selected operational parameters is formatted, or encoded, prior to transmission to the receiver module 30. In particular, the control 50 encodes the user-selected operational parameters according to an encoding algorithm stored in memory. According to one embodiment, the encoding algorithm includes a map of approved values designed to increase data integrity and optimize signal formation for transmission over the gas supply line 28.

Preferably, since rise and fall times of gas flow through the gas supply line 28 are not equal, encoding the operational parameters according to an optimized set of sequences reduces the potential of transmitting a signal that may be incorrectly received by the receiver module 30. For example, consecutive bits of data represented by gas flow or "ON" periods within the gas supply line 28 have an increased probability of erroneous decoding. Therefore, according to one embodiment, 10 bits of data are encoded into a 16-bit symbol to eliminate consecutive ON bits. According to one embodiment, one set of per nibble data values expressed in hexadecimal format include 0×0, 0×1, 0×2, 0×4, 0×8, 0×9, 0×A. However, it is contemplated that multiple value sets are equivalently acceptable. For example, though not included in the exemplary set of values, the hexadecimal value 0×5 could be included in a value set as the binary equivalent of 0×5 does not include consecutive "true" or ON bits. Additionally, while these values represent valid components of encoded data construction, it is advantageous that the values not be randomly combined because they could result in consecutive ON bits. For example, 0×009 is not a valid symbol because the "1" and "9" would result in consecutive ON bits in the bit stream. Therefore, it is contemplated that a fixed map of approved values and combinations may be stored in memory and accessed to perform data encoding in order increase data integrity and optimize signal formation for transmission over the gas supply line 28. Since a limited number of values are needed in this application, a look-up table also conserves processing power.

Additionally, it is contemplated that all data be prefixed with a 4-bit preamble to assist in reception and aid in data qualification. Therefore, according to one embodiment, the preamble is a hexadecimal value selected from the valid set of symbols and having a leading ON bit. In accordance with one embodiment, the preamble is 0×A because its binary equivalent is "1010", which does not have consecutive ON bits and includes a leading "1".

Therefore, for example, should an operator desire a 22.5 Volt (V) welding output from a welding power source that has voltage output range of approximately 10 to 35 V, the operator will select 22.5 V via the voltage selector 44. The control 50 then reads the selected voltage as a specific value within a spectrum of potential voltage outputs. That is, according to one embodiment, the spectrum of potential voltage outputs are divided into 1,024 values ranging from 0 to 1,023. As such, a voltage selection of 22.5 V corresponds to the $512_{th}$ value. The control 50 uses the value, 512, to determine a corresponding hexadecimal value from the map or table of approved values stored in memory. According to one embodiment, a value of 512 corresponds to the hexadecimal value of 0×4129. The controller takes the hexadecimal value, adds the preamble value of 0×A, and converts the result to a binary equivalent. Therefore, according to this example, the control 50 generates a binary value of "10100100000100101001".

Once the operational parameter is encoded as a binary value, the control 50 controls the solenoid/valve 52 to control the flow of gas from the gas source 26 to communicate the binary value. Specifically, the control 50 controls the solenoid 52 to systematically actuate the purge valve of the wire feeder 14 to start and stop the flow of gas through the gas supply cable 28 whereby flowing gas signals a "1" and non-flowing gas signals a "0". Therefore, according to the example discussed above, the control 50 controls the solenoid/valve 52 to start and stop the flow of gas to communicate the encoded binary value 10100100000100101001. That is, the control 50 controls the solenoid/valve 52 to start and stop the flow of gas to create the following pattern of gas flow: ON, OFF, ON, OFF, OFF, ON, OFF, OFF, OFF, OFF, ON, OFF, OFF, ON, OFF, ON, OFF, OFF, ON.

The receiver module 30 continuously monitors the gas supply line 28 to determine whether there are changes in the flow rate of gas through the gas supply line 28 that correspond to a bit stream representing the preamble (ON, OFF, ON, OFF) and subsequent operational parameters. Specifically, the receiver module 30 is designed to measure a difference in the flow rate of the gas through the gas supply line 28 to identify changes in flow rate. Accordingly, the receiver module 30 preferably includes a fixed orifice 56 that the gas flows through. According to one embodiment, a differential pressure transducer 54 is configured to measure changes in flow rate through the fixed orifice 56 and generate an analog signal indicating the flow rate of gas through the fixed orifice 56. As such, the analog output of the differential pressure transducer 54 is sampled with an analog to digital (A/D) converter/processor 58 to derive digital data representing the bit stream of flow changes representing the operational parameter transmitted by the transmission module 34.

Continuing with the above-described example, the receiver module 30 continuously monitors the gas supply cable 28 to determine a pattern of gas flow variations corresponding to the preamble of 0×A or ON, OFF, ON, OFF. Once this sequence of gas flow variations is identified, the receive module 30 prepares to receive a valid operational parameter. Therefore, following the example, the receive module 30 identifies a gas flow pattern or encoded bit stream of pressure variations created by the gas flow pattern of: OFF, ON, OFF, OFF, OFF, OFF, OFF, ON, OFF, OFF, ON, OFF, ON, OFF, OFF, ON.

Once the encoded bit stream of pressure variations created by the gas flow pattern is acquired, the processor 58 decodes the encoded bit stream back into the original 10-bit value encoded by the transmission module 34. Therefore, following the above-described example, the processor 58 converts the encoded bit stream of 0100000100101001 back to the hexadecimal value of 0×4129 and, in turn, back to the decimal value of 512, or the midpoint of the power spectrum of the power source. Once decoded, the receiver module 30 communicates the original 10-bit value representing the desired operational parameter as a command to the welding power source 12 to change operational parameters to match the desired operational parameters received from the transmission module 34 over the gas supply line 28. Specifically, the decimal value, in this case 512, is communicated as a corresponding voltage within a voltage signal spectrum. That is, since 512 is a midpoint in the power spectrum between 0 and 1,023, a voltage signal, for example 5 V within a voltage signal spectrum ranging from 0 to 10 V, communicates this value to the power source 12. The power source 12 receives the 5 V signal and automatically sets the welding output to 22.5 V, or the midpoint of the voltage output range of approximately 10 to 35 V.

Figure 3:
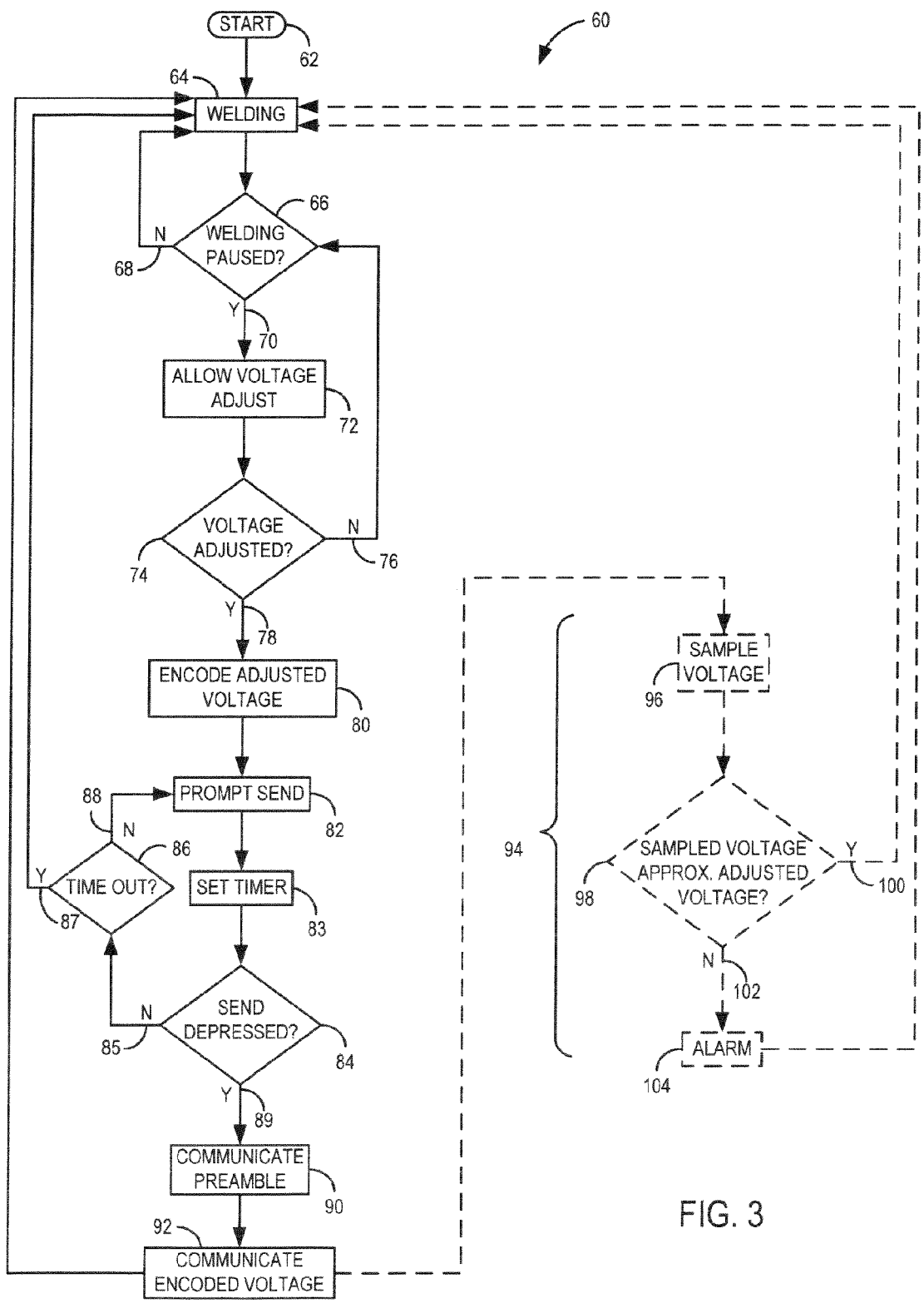
FIG. 3 is a flow chart illustrating a technique for remotely transmitting control commands in accordance with one aspect of the present invention.
Figure 4:
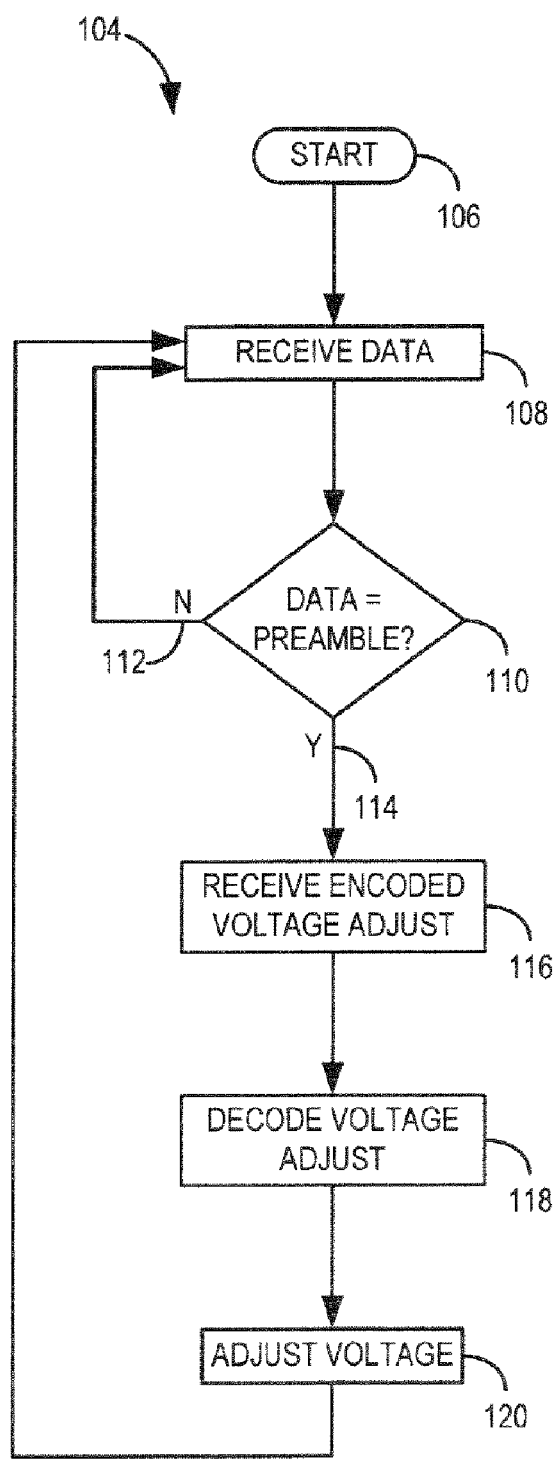
FIG. 4 is a flow chart illustrating a technique for receiving and responding to remotely transmitted control commands in accordance with one aspect of the present invention.

The above-described communications protocol is further described with respect to FIGS. 3 and 4. Specifically, FIG. 3 is a flow chart illustrating a technique 60 for remotely transmitting control commands in accordance with the present invention. The technique 60 starts 62 following welding 64 according to the initially set operational parameters. The technique 60 continues by checking whether welding and, therefore, gas flow, has paused 66. If the welding process has not paused 68, the current operational parameters are appropriate for the desired welding process and welding continues 64. Once welding is paused 70, the system allows operational parameters to be adjusted 72. As previously described, for exemplary purposes, the operational parameter to be changed is voltage. However, it is contemplated that any of a variety of operational parameters may be equivalently modified according to the described technique 60.

Once voltage adjustment is permitted 72, the system waits for an adjusted voltage to be selected 74. If the voltage is not adjusted 76, the system continues welding at the previous settings, or if still paused 66, 70, the system continues to allow voltage adjustment 72. Upon receipt of an adjusted voltage 78, the system encodes the adjusted voltage for transmission across the gas supply cable 80. Once the voltage is encoded 80, the system displays an operator prompt requesting the operator to approve and send the adjusted voltage value 82 and initiates a timer. As such, the system waits for the send button to be depressed 84. If a send command is not entered 85, the system checks the timer to determine if the timer has expired 86. If the timer has expired before the send button is depressed 87, the system is prepared to commence welding 64 according to the previous operational parameters. However, if the timer has not yet expired 88, the system continues to prompt the operator 82. Once the send is depressed 89, the system communicates the preamble 90 to indicate to the receiver module that a valid bit stream indicating an augmented operational parameter is to follow 92. Once the new operational parameter is sent 92, the system is prepared to commence welding 64 according to the new operational parameter, in this case, the adjusted voltage.

Optionally, it is contemplated that a confirmation technique 94 may be included to determine whether the transmitted operational parameters were received and correctly implemented. Specifically, following transmission of the encoded adjusted voltage 92, the system may initiate and sample a voltage of a subsequent arc 96. This sampled voltage is then compared to the adjusted voltage selected by the operator to determine if the sampled and adjusted voltage are substantially equivalent 98.

If the sampled and adjusted voltages are substantially equivalent 100, the transmitted adjusted voltage was correctly received, decoded, and implemented and welding according to the adjusted voltage can commence 64. On the other hand, should the sampled and adjusted voltages not be substantially equivalent 102, the transmitted voltage was not correctly received, decoded, or implemented and an alarm is communicated 104. It is contemplated that the alarm may include an auditory and/or visual alarm to alert the operator that the adjusted voltage was not correctly implemented. Additionally, it is contemplated that the sensed voltage may be displayed so that the user can review the actual voltage and identify the margin of difference between the desired voltage and the sensed voltage. As such, the operator may determine whether to continue welding 64 or readjust the voltage 66–92.

Referring now to FIG. 4, a flow chart illustrating a technique 104 for receiving and responding to remotely transmitted control commands is shown. The technique 104 starts 106 by monitoring gas flow through the gas supply line to derive bit streams from gas flow variations 108. The gas flow variations that may correspond to a data bit stream are check to determine whether they correspond to the stored preamble value 110. If the data does not correspond to the stored preamble 112, the system continues monitoring for another potential data bit stream 108.

Once a bit stream is received that corresponds to the valid preamble 114, the system prepares to receive the encoded bit stream representing the user-adjusted voltage 116. The bit stream is then decoded 118 and the communicated as a command to adjust the voltage of the power source to match the received voltage 120. Once the power source voltage has been set to the adjusted voltage 120, the system continues to monitor gas flow variations to identify other potential valid bit streams 108.

Figure 5:
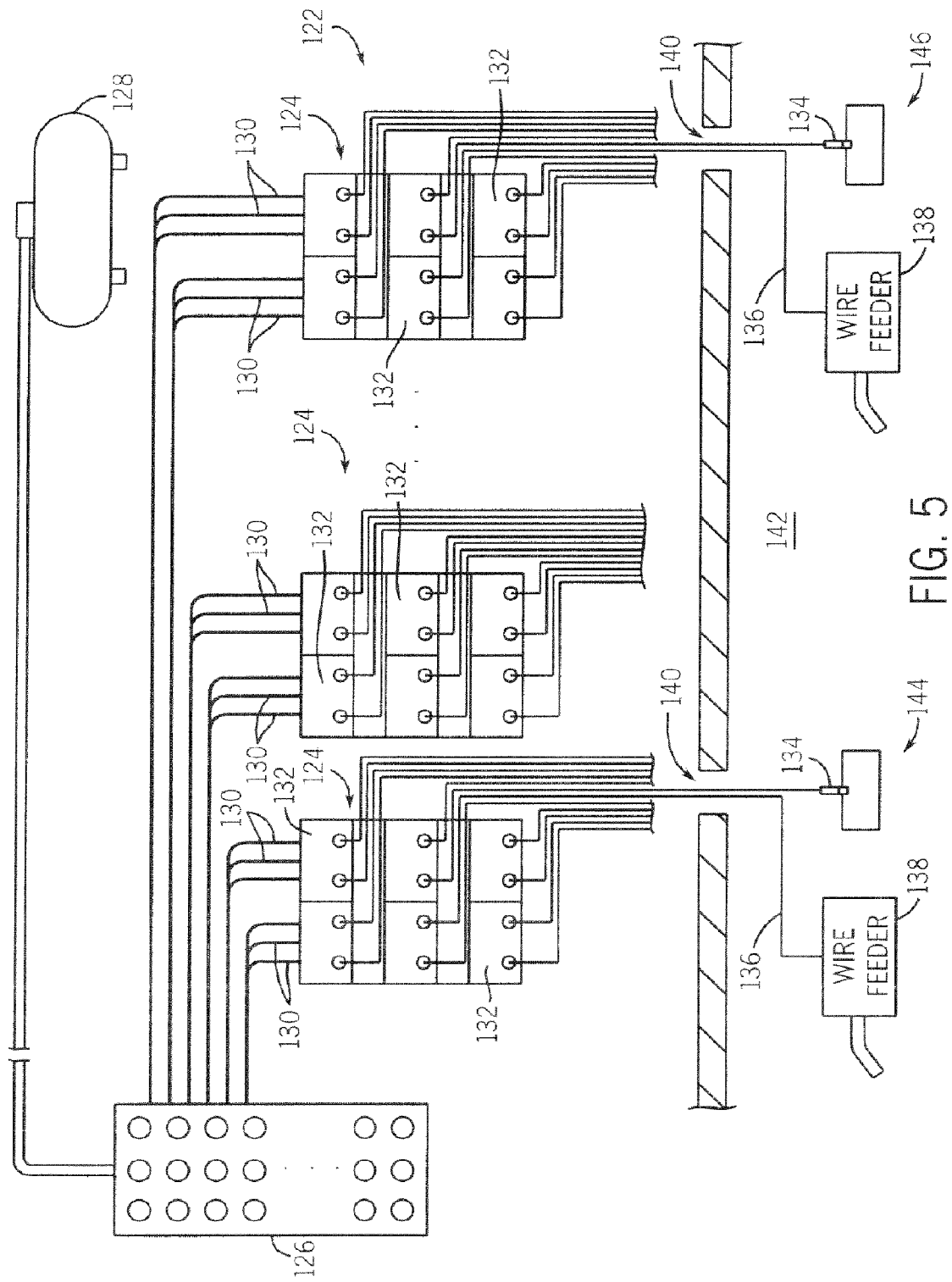
FIG. 5 is a schematic of a multi-operator system incorporating the present invention.

Referring now to FIG. 5, a schematic of a multi-operator operational system 122 incorporating the present invention is shown. The system 122 includes a plurality of multi-operator welding banks 124 that each contains multiple individual welding power sources 132. The plurality of multi-operator welding banks 124 are connected via a regulator bank 126 to a shielding gas reservoir 128. Therefore, shielding gas is provided from the shielding gas reservoir 128 and independently regulated by the regulator bank 126 to provide individual shielding gas supplies 130 to each welding power source 132.

As stated, the multi-operator welding banks 124 include a plurality of individual power sources 132, which have separate workpiece clamps 134 and weld power/gas supply lines 136. Connected to the weld power/gas supply lines 136 are portable wire feeders 138. Accordingly, a particular operator of the multi-operator operational system 122 may be located within a particular work environment that is at a significant distance from the multi-operator welding banks 124. For example, the workpiece clamp 134 and weld power/gas supply line 136 may be fed through restrictive locations, such as a porthole 140 during shipbuilding applications, to an operator located within the operating environment 142, or ship hull, located at a distance from the multi-operator welding banks 124. Accordingly, an operator is permitted move about within the operating environment 142 to and from multiple, or portable locations 144, 146 to perform the desired welding processes.

However, once an operator is within the operating environment 142, it would be significantly cumbersome to repeatedly traverse to and from the operating environment 142 and multi-operator welding banks 124 to augment operational parameters as may be necessary to meet the specific welding requirements of the various portable locations 144, 146. Accordingly, by utilizing the above-described system for communicating changes to desired operating parameters from the portable locations 144,146 to the welding power sources 132 over the gas supply cables 136, an operator can move from a first portable location 144 requiring a first set of operational parameters for welding to a second portable location 146 requiring a second set of operational parameters for welding without having to travel back to the multi-operator welding banks 124 to change from the first set of operational parameters to the second set of operational parameters. Rather, the operator need only cease welding, enter the second set of operational parameters into a user interface integrated with the wire feeder 138, and send the second set of operational parameters over the gas supply cable 136 to the remotely located multi-operator welding banks 124. Once the variations in gas flow corresponding to the second set of operational parameters is received by a receiver module integrated with a corresponding power source 132, the receiver communicates the new operational parameters to the power source 132 to augment the operational parameters accordingly. Once this process is complete, the operator can commence welding at the second portable location 146 according to the second set of operational parameters.

Accordingly, a viable mechanism to communicate information from a portable device, such as wire feeder, to a remote system is created without the introduction of additional connections between the wire feeder and the power source. Furthermore, since the system uses the shielding gas hose connection and the gas flowing therethrough as the communications medium to communicate changes in operational parameters, it is virtually impervious to electrical noise that may be present in the welding environment.

Therefore, the present invention includes a communications system having a user interface to accept a user input at a portable location and a gas state modifier to systematically alter a state of gas in a gas line connecting the portable location to a remote location based on the user input. The communications system also includes a sensor to sense state changes in the gas line at the remote location and a processor configured to convert the sensed state changes to a representation of the user input.

In another embodiment of the present invention, a wire feeder is includes a gas flow controller configured to control gas flow from a gas supply line connected to a gas source and at least one user interface configured to accept at least one desired operational parameter of a desired welding process. The wire feeder also includes a transmission controller configured to accept the at least one operational parameter and control the gas flow controller to communicate the at least one operational parameter across the gas supply line.

An alternate embodiment of the present invention includes a welding power source control module having an inlet configured to receive welding gas from a gas source, an outlet configured to allow the welding gas to pass from the control module, and a passage connecting the inlet and the outlet. The welding power source control module also includes a controller configured to monitor the passage to determine variations in a flow rate of the welding gas indicative of a communications bit stream and read the communications bit stream. The controller is also configured to determine a user-selected operational parameter from the communications bit stream and communicate the user-selected operational parameter to a welding power source.

In accordance with yet a further embodiment of the present invention, a communications kit configured to retrofit a welding-type system includes a transmission module configured to accept a user-selected welding parameter and control a flow of welding gas to communicate the user-selected welding parameter. The communications kit also includes a receiver module configured to monitor the flow of welding gas to receive and interpret the user-selected welding parameter and communicate the user-selected welding parameter to a welding power source.

Another embodiment of the present invention includes a method of communicating data. The method includes receiving a user input at a portable location and systematically purging pressurized gas from a gas line connecting the portable location to a remote location based on the user input. The method also includes sensing pressure changes in the gas line at the remote location and interpreting the sensed pressure changes to form a representation of the user input.

The present invention has been described in terms of the preferred embodiment, and it is recognized that equivalents, alternatives, and modifications, aside from those expressly stated, are possible and within the scope of the appending claims.

What is claimed is:

1. A communications system operable with a welding-type apparatus comprising:
a user interface to accept a user input at a portable location;
a gas state modifier to systematically alter a state of gas flow in a gas line based on the user input, the gas line connecting the portable location to a remote location and used to facilitate a welding-type application;
a sensor to sense gas flow state changes in the gas line at the remote location; and
a processor configured to convert the gas flow state changes to a representation of the user input to modify operation of the welding-type application.

2. The communications system of claim 1 wherein the processor is located at the remote location.

3. The communications system of claim 1 further comprising an encoder configured to encode the user input as a series of gas flow state changes representing the user input.

4. The communications system of claim 3 wherein the series of gas flow state changes include a purge period and pressure period and wherein the series of gas flow state changes is free of consecutive purge periods.

5. The communications system of claim 3 wherein the gas state modifier includes a valve configured to purge the gas from the gas line according to the encoded series of gas flow state changes.

6. The communications system of claim 5 wherein the sensor includes a pressure sensor configured to identify variations in flow of the gas from the gas line indicative of the encoded series of state changes and wherein the processor is configured to sample the identified variations in flow of the gas to decode the user input.

7. The communications system of claim 1 further comprising a fixed orifice and wherein the sensor is configured to monitor the fixed orifice to sense the gas flow state changes in the gas line at the remote location.

8. The communications system of claim 1 wherein the user interface includes at least one of a welding-type voltage selection input, a send welding-type voltage selection input, and a display.

9. The communications system of claim 1 wherein the user interface is integrated with at least one of portable welding wire feeder, a portable welding torch, and a portable plasma-cutting torch.

10. The communications system of claim 1 wherein the user input includes a welding-type operational parameter and wherein the processor is further configured to communicate the user input to a welding-type power source located at the remote location.

11. The communications system of claim 1 wherein the gas flow state changes include 'ON' and 'OFF' modes of gas flow through a shielding gas cable.

12. The communications system of claim 1 wherein the gas is pressurized in the gas line.

13. A welding-type communications transmitter comprising:
a gas flow controller configured to control shielding gas flow to a torch from a gas supply line connected to a gas source to provide shielding gas to the torch;
at least one user interface configured to accept at least one desired operational parameter of a desired welding-type process;
an electronic transmission controller configured to:
accept the at least one operational parameter; and
control the gas flow controller to communicate the at least one operational parameter across the gas supply line.

14. The welding-type communications transmitter of claim 13 wherein the transmission controller is further configured to control the gas flow controller to stabilize gas flow prior to communicating the at least one operational parameter across the gas supply line.

15. The welding-type communications transmitter of claim 13 wherein the transmission controller is further configured to communicate a preamble across the gas supply line prior to communicating the at least one operational parameter to indicate to a receiver that a valid operational parameter will follow thereafter.

16. The welding-type communications transmitter of claim 13 wherein the gas flow controller includes a solenoid configured to actuate a valve configured to purge gas flow from the gas supply line.

17. The welding-type communications transmitter of claim 13 wherein the at least one user interface includes at least one of a voltage selection input, a send transmission input, and a voltage selection display.

18. The welding-type communications transmitter of claim 17 further comprising a converter configured to accept a selected voltage from the voltage selection input and communicate the selected voltage to the transmission controller and wherein, upon receiving the selected voltage, the transmission controller is configured to communicate the selected voltage to the voltage selection display and prepare the selected voltage for transmission across the gas supply line.

19. The welding-type communications transmitter of claim 13 wherein the transmission controller is further configured to encode the at least one operational parameter for transmission across the gas supply line to a remote receiver.

20. The welding-type communications transmitter of claim 19 wherein the receiver is integral with a welding-type power source and is configured to monitor variations in flow rate of the gas through the gas supply line to receive the encoded at least one operational parameter from the transmission controller.

21. The welding-type communications transmitter of claim 13 wherein the transmission controller is configured to control the gas flow controller to communicate the at least one operational parameter to a welding-type power source.

22. A welding-type power source control module comprising:
    an inlet configured to receive gas from a gas source;
    an outlet configured to allow the gas to pass from the control module;
    a passage connecting the inlet and the outlet; and
    a controller configured to:
        monitor the passage to determine variations in a flow rate of the gas indicative of a communications bit stream;
        read the communications bit stream;
        determine a user-selected operational parameter from the communications bit stream; and
        communicate the user-selected operational parameter to a welding-type power source.

23. The control module of claim 22 wherein the passage includes a fixed orifice and wherein the controller includes a differential pressure transducer configured to determine variations the flow rate of the gas through the fixed orifice.

24. The control module of claim 22 wherein the controller is further configured to decode the communications bit stream to determine the user-selected operational parameter.

25. The control module of claim 22 wherein the controller is further configured to determine a validating preamble from the communications bit stream prior to determining the user-selected operational parameter.

26. The control module of claim 22 further comprising a remote transmitter configured to be integrated with a remote wire feeder to cause variations in flow rate of the gas indicative of the communications bit stream.

27. A communications kit configured to retrofit a welding-type system comprising:
    a transmission module configured to accept a user-selected welding-type parameter and control a flow of gas to encode the user-selected welding-type parameter thereon; and
    a receiver module configured to monitor the flow of gas to receive and decode the user-selected welding-type parameter therefrom and communicate the user-selected welding-type parameter to a welding-type power source.

28. The communications kit of claim 27 wherein the transmission module is further configured to encode the user-selected welding-type parameter as a bit stream free of consecutive true bits.

29. The communications kit of claim 28 wherein the receiver module includes a fixed orifice configured to allow the gas to flow from a gas supply to the transmission module and a differential pressure transducer configured to determine variations in a flow rate of the gas through the fixed orifice corresponding to the bit stream.

30. The communications kit of claim 28 wherein the receiver module is further configured to decode the bit stream to interpret the user-selected welding-type parameter.

31. The communications kit of claim 27 wherein the transmission module is configured to be integrated with a remote wire feeder system to control a purge valve in the remote wire feeder system to thereby communicate the user-selected welding-type parameter.

32. The communications kit of claim 27 wherein the transmission module further comprises:
    a user interface including at least one of a voltage selection input, a send transmission input, and a voltage selection display; and
    a converter configured to accept a selected voltage from the voltage selection input and communicate the selected voltage to the voltage selection display and encode the selected voltage for transmission to the receiver module.

33. The communications kit of claim 27 wherein the user-selected operational parameter includes at least one of welding-type power source output commands, on/off commands, and mode control commands.

34. A method of communicating data over a welding-type gas line comprising:
    receiving a user input at a portable location;
    systematically purging pressurized gas from a gas line connecting the portable location to a remote location based on the user input;
    sensing pressure changes in the gas line at the remote location; and
    interpreting the sensed pressure changes to a digital representation of the user input.

35. A welding-type communications transmitter comprising:
    a gas flow controller configured to control gas flow from a gas supply line connected to a gas source;
    at least one user interface configured to accept at least one desired operational parameter of a desired welding-type process, the at least one user interface having a voltage selection input;
    a transmission controller configured to:
        accept the at least one operational parameter; and
        control the gas flow controller to communicate the at least one operational parameter across the gas supply line.

36. The welding-type communications transmitter of claim 35 wherein the at least one user interface further includes at least one of a send transmission input and a voltage selection display.

37. The welding-type communications transmitter of claim 36 further comprising a converter configured to accept a selected voltage from the voltage selection input and communicate the selected voltage to the transmission controller and wherein, upon receiving the selected voltage, the transmission controller is configured to communicate the selected voltage to the voltage selection display and prepare the selected voltage for transmission across the gas supply line.

\* \* \* \* \*

UNITED STATES PATENT AND TRADEMARK OFFICE
CERTIFICATE OF CORRECTION

PATENT NO. : 7,247,814 B2  Page 1 of 1
APPLICATION NO. : 10/907179
DATED : July 24, 2007
INVENTOR(S) : Brian L. Ott It is certified that error appears in the above-identified patent and that said Letters Patent is hereby corrected as shown below:

Col. 6, line 63, delete "0x009" and substitute therefore -- 0x0019 --.

Col. 7, line 25, delete "coffesponds" and substitute therefore -- corresponds --.

Signed and Sealed this

Sixteenth Day of October, 2007

JON W. DUDAS
*Director of the United States Patent and Trademark Office*